United States Patent
Mori (10) Patent No.: US 12,439,152 B2
(45) Date of Patent: Oct. 7, 2025

(54) IMAGE CAPTURING APPARATUS, CONTROL METHOD THEREFOR, AND STORAGE MEDIUM

(71) Applicant: CANON KABUSHIKI KAISHA, Tokyo (JP)

(72) Inventor: Naomi Mori, Kanagawa (JP)

(73) Assignee: Canon Kabushiki Kaisha, Tokyo (JP)

( * ) Notice: Subject to any disclaimer, the term of this patent is extended or adjusted under 35 U.S.C. 154(b) by 168 days.

(21) Appl. No.: 18/455,186

(22) Filed: Aug. 24, 2023

(65) Prior Publication Data
US 2024/0080551 A1   Mar. 7, 2024

(30) Foreign Application Priority Data
Aug. 26, 2022  (JP) ................. 2022-134690

(51) Int. Cl.
*H04N 23/667* (2023.01)
*H04N 23/62* (2023.01)

(52) U.S. Cl.
CPC ........... *H04N 23/667* (2023.01); *H04N 23/62* (2023.01)

(58) Field of Classification Search
CPC ....... H04N 23/667; H04N 23/62; H04N 23/67
USPC ....................................................... 348/345
See application file for complete search history.

(56) References Cited

U.S. PATENT DOCUMENTS

| | | | |
|---|---|---|---|
| 7,466,504 B1* | 12/2008 | Koyama | G02B 7/102 359/822 |
| 10,225,452 B2* | 3/2019 | Kozakura | H04N 1/4433 |
| 10,274,813 B2* | 4/2019 | Noguchi | G03B 3/10 |
| 10,277,723 B2* | 4/2019 | Ito | H04M 1/0264 |
| 11,089,199 B2* | 8/2021 | Takanashi | G03B 17/565 |
| 2013/0271860 A1* | 10/2013 | Arakawa | G02B 7/105 359/823 |
| 2016/0105613 A1* | 4/2016 | Takanashi | H04N 23/673 348/333.02 |
| 2016/0344909 A1* | 11/2016 | Noguchi | G02B 7/08 |
| 2017/0187945 A1* | 6/2017 | Ikeda | H04N 23/667 |
| 2017/0187946 A1* | 6/2017 | Kozakura | H04N 23/62 |
| 2018/0259739 A1* | 9/2018 | Ooya | G02B 7/09 |
| 2019/0394388 A1* | 12/2019 | Takanashi | H04N 23/63 |
| 2021/0157091 A1* | 5/2021 | Yamazaki | G03B 5/04 |
| 2021/0337107 A1* | 10/2021 | Takanashi | H04N 23/69 |

FOREIGN PATENT DOCUMENTS

JP    2002148505 A    5/2002

\* cited by examiner

*Primary Examiner* — Pritham D Prabhakher
(74) *Attorney, Agent, or Firm* — Canon U.S.A., Inc. IP Division (57) ABSTRACT

An apparatus configured to set a focus mode to autofocus for automatically focusing on a subject or manual focus for manually focusing on a subject includes a control unit configured to perform control to set the focus mode to the autofocus when a dual-purpose member configured to switch to be operated as a first member for manual focus operation or to be operated as a second member for an operation other than the manual focus operation is operated as the second member.

17 Claims, 8 Drawing Sheets

IMAGE CAPTURING APPARATUS, CONTROL METHOD THEREFOR, AND STORAGE MEDIUM

BACKGROUND

Technical Field

The aspect of the embodiments relates to an image capturing apparatus, a control method therefor and a non-transitory computer-readable storage medium.

Description of the Related Art

A user gets ready to take a picture with a camera, such as an interchangeable-lens camera, while holding the lens barrel protruding from the main body of the camera toward a subject with his or her left hand. The left hand touches the lens barrel in such a holding manner, so that a ring for a predetermined operation to be performed with may be mounted on the lens barrel. Examples as this type of ring include a focus ring that enables a user to perform a manual focus operation.

It is, however, difficult to mount a plurality of rings to the lens barrel of a small lens or an inexpensive lens. To address this issue, a dual-purpose ring may be mounted that can be switched to be used as a focus ring or as a ring for an operation other than a manual focus operation.

There is, however, an issue that a dual-purpose ring is used with a combination of a setting where the dual-purpose ring is operated as a ring for an operation other than a manual focus operation and a setting where the focus mode is set to the manual focus operation. This combination prevents the user from quickly adjusting focus with the dual-purpose ring from an out-of-focus state. In order to perform focusing, the dual-purpose ring is switched to be operated as a focus ring, or the focus mode is switched to autofocus. It is, however, difficult to mount a switch for dual-purpose ring switching or focus mode switching to the lens barrel of a small lens or an inexpensive lens. For this reason, these switching operations are performed on, for example, a settings menu on the main body of a camera, involving changing a posture of holding the camera, leading to a low operability.

As described above, a combination of the switching setting of a dual-purpose ring and a focus mode may cause inconvenience.

Japanese Patent Application Laid-Open No. 2002-148505 discusses a camera including a setting member for setting automatic focus adjustment and manual focus adjustment. The setting member is set to the automatic focus adjustment when a barrier is moved from an image capturing state in which the manual focus adjustment is set with the setting member to a closed position in which the barrier covers an image capturing lens.

However, Japanese Patent Application Laid-Open No. 2002-148505 does not obviate the inconvenience caused by a combination of the switching setting of a dual-purpose ring and a focus mode.

SUMMARY

According to an aspect of the embodiments, an apparatus configured to set a focus mode to autofocus for automatically focusing on a subject or manual focus for manually focusing on a subject includes a control unit configured to perform control to set the focus mode to the autofocus when a dual-purpose member configured to switch to be operated as a first member for manual focus operation or to be operated as a second member for an operation other than the manual focus operation is operated as the second member.

Further features of the disclosure will become apparent from the following description of exemplary embodiments with reference to the attached drawings.

DESCRIPTION OF THE EMBODIMENTS

An exemplary embodiment of the disclosure will be described with reference to the accompanying drawings.

Figure 1A:
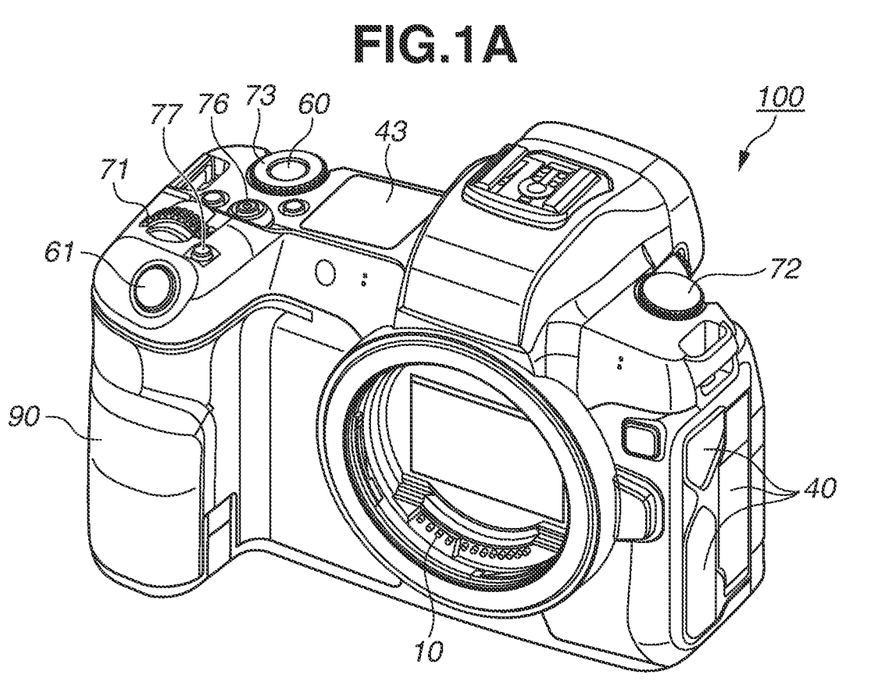
FIGS. 1A and 1B are external views of a digital camera according to an exemplary embodiment.
Figure 1B:
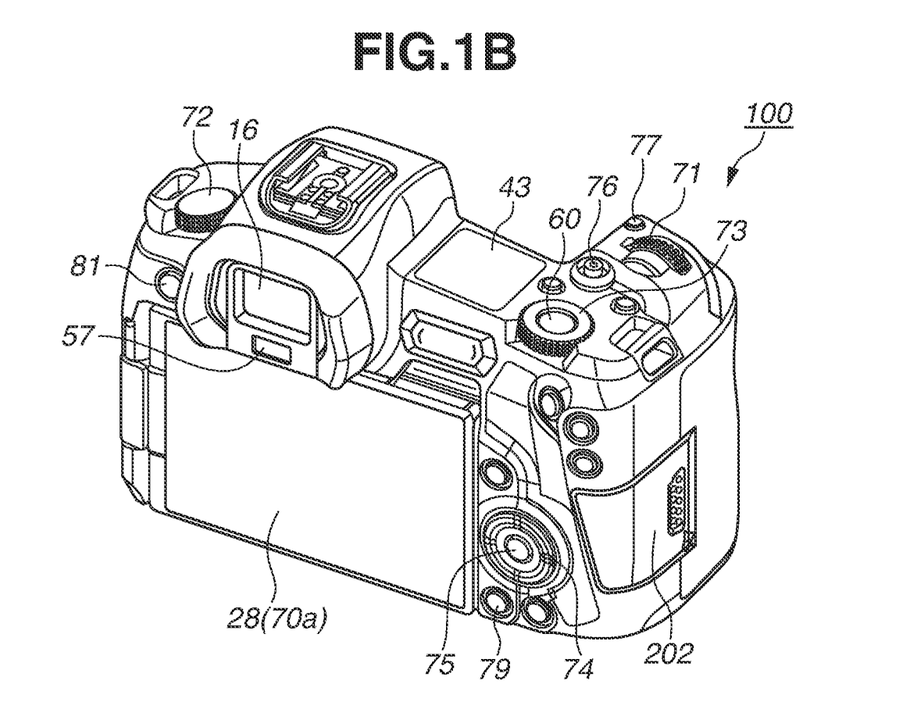

FIGS. 1A and 1B illustrate external views of a digital camera (hereinafter simply referred to as a camera) 100 as an example of an image capturing apparatus to which the disclosure is applied. FIG. 1A is a front perspective view of the camera 100, and FIG. 1B is a rear perspective view of the camera 100. A lens unit 150 (see FIG. 2) described below is attachable to and detachable from the camera 100.

The camera 100 is an image capturing apparatus in which a focus mode can be set to autofocus for automatically focusing on a subject or to manual focus for manually focusing on a subject.

A display unit 28 is a display unit provided on the back of the camera 100, and displays images and various types of information. A touch panel 70a detects a touch operation on the display surface (touch operation surface) of the display unit 28. An out-of-finder display unit 43 is a display unit provided on the upper surface of the camera 100, and displays various setting values, such as a shutter speed and an aperture. A shutter button 61 is an operation member for giving an image capturing instruction. A mode changeover switch 60 is an operation member for switching various modes. A terminal cover 40 is a cover that protects a connector (not illustrated), for example, for a connection cable that connects the camera 100 to an external device.

A main electronic dial 71 is a rotary operation member, and is used for changing setting values, such as a shutter speed and an aperture. A power source switch 72 is an operation member for switching the power of the camera 100 between ON and OFF. A sub electronic dial 73 is a rotary operation member, and is used for moving a selection frame (cursor), image feeding, and other operations. A cross key 74 has upper, lower, left, and right portions that are pressable, and processing corresponding to a pressed portion is performed. A SET button 75 is an operation member mainly used for determining a selection item. A moving image button 76 is an operation member for giving an instruction to start or stop moving image capturing (recording). A multi-function (M-Fn) button 77 is an operation member for quickly changing various types of setting, such as white balance and International Organization for Standardization (ISO) speed, by being pressed in an image capturing standby state. A playback button 79 is an operation member for switching between an image capturing mode and a playback mode. By pressing the playback button 79 during the image capturing mode, the mode transitions to the playback mode, and the latest image among the images recorded in a storage medium 200 to be described below can be displayed on the display unit 28. A menu button 81 is an operation member for giving an instruction operation for displaying a menu screen. By pressing the menu button 81, the menu screen on which various types of setting can be made is displayed on the display unit 28. A user can intuitively make various types of setting using the menu screen displayed on the display unit 28, the cross key 74, and the SET button 75.

A communication terminal 10 is a communication terminal for the camera 100 to communicate with the lens unit 150. An eyepiece portion 16 is an eyepiece portion of an eyepiece finder (a look-through finder), and the user can visually recognize an image displayed on an internal electronic view finder (EVF) 29 through the eyepiece portion 16. An eye proximity detecting unit 57 includes an eye proximity detecting sensor that detects whether an eye of the user (photographer) is in the proximity of the eyepiece portion 16. A cover 202 is a cover of a slot for storing the storage medium 200. A grip portion 90 is a holding portion having a shape that is easily gripped by the right hand when the user holds the camera 100. The shutter button 61 and the main electronic dial 71 are arranged at positions where the shutter button 61 and the main electronic dial 71 are operable by the index finger of the right hand while the grip portion 90 is gripped by the little finger, the third finger, and the middle finger of the right hand to hold the camera 100. The sub electronic dial 73 is arranged at a position where the sub electronic dial 73 is operable by the right thumb in the same state.

Figure 2:
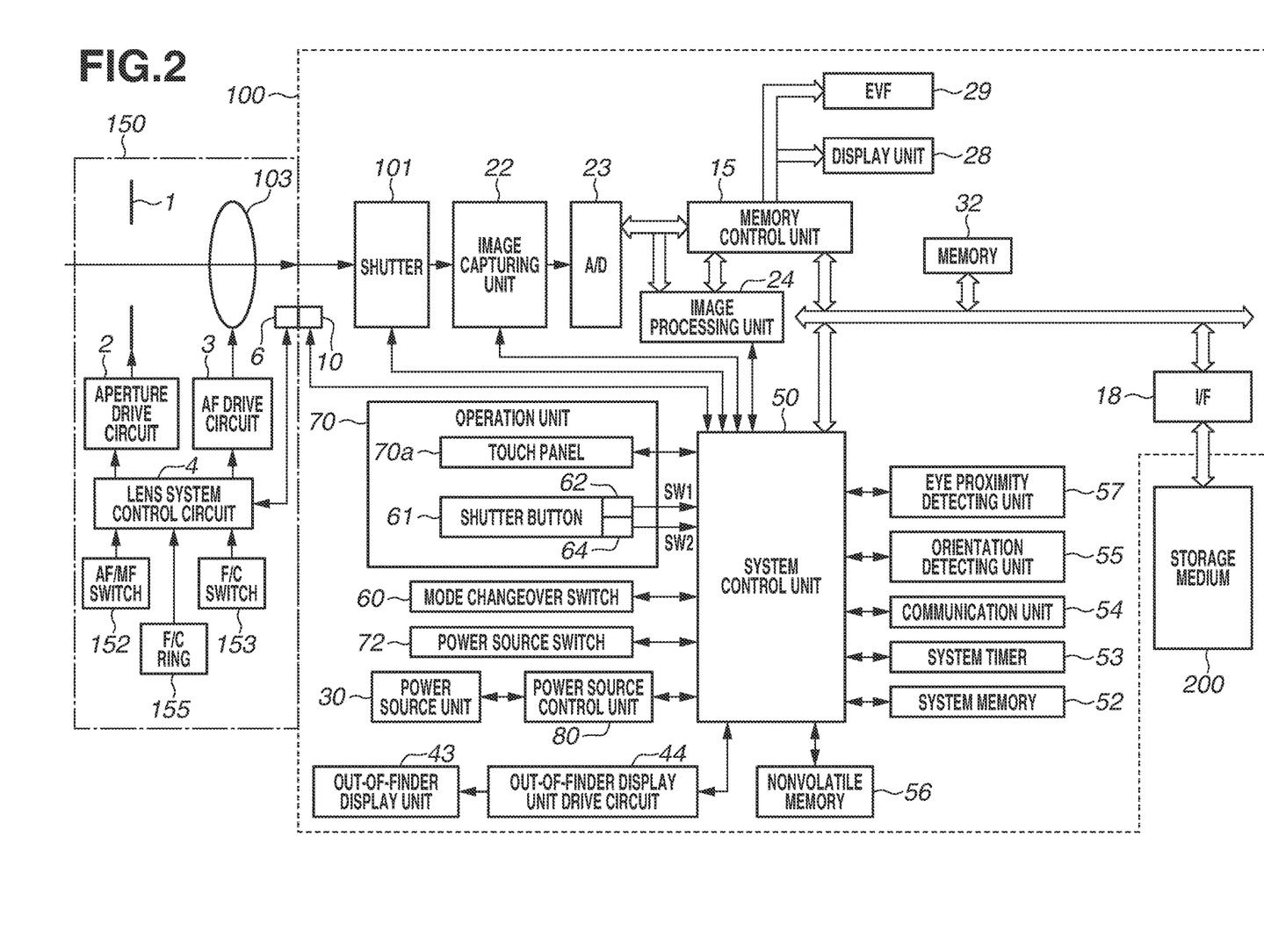
FIG. 2 is a block diagram illustrating a configuration example of the digital camera according to the exemplary embodiment.

FIG. 2 is a block diagram illustrating an example configuration of the camera 100 according to the exemplary embodiment. Like numbers refer to like components in FIG. 1.

The lens unit 150 is detachably attached to the camera 100. The lens unit 150 includes an aperture 1, a lens 103, an aperture drive circuit 2, an autofocus (AF) drive circuit 3, a lens system control circuit 4, and a communication terminal 6. Although the lens 103 is usually composed of a plurality of lenses, a single lens is illustrated here as the lens 103 for simplicity. The communication terminal 6 is a communication terminal for the lens unit 150 to communicate with the camera 100. The lens unit 150 communicates with a system control unit 50 via the communication terminals 6 and 10. In the lens unit 150, the lens system control circuit 4 controls the aperture 1 via the aperture drive circuit 2. Further, in the lens unit 150, the position of the lens 103 is moved by the lens system control circuit 4 via the AF drive circuit 3 to adjust the focus.

Figure 7A:
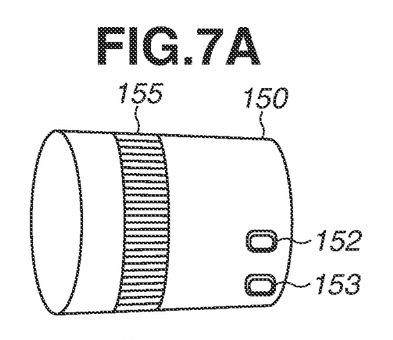
FIGS. 7A to 7G illustrate configuration examples of lens units.

As illustrated in FIG. 7A, an autofocus/manual focus (AF/MF) switch 152, a focus/control (F/C) ring (focus/control dual-purpose ring) 155, and a focus/control (F/C) switch (focus/control changeover switch) 153 are arranged on the lens barrel of the lens unit 150.

The AF/MF switch 152 is a focus mode setting unit, and a switch for switching the focus mode to the AF or the MF. The user can select the AF or the MF by switching the position of the AF/MF switch 152. In the AF, the focus is adjusted by moving the lens 103 via the AF drive circuit 3. In the MF, the lens 103 is moved by MF operation performed by the user.

The F/C ring 155 is a dual-purpose operation member allowing switching between operation as a focus ring and operation as a control ring. The focus ring is a ring that allows MF operation. In the present exemplary embodiment, the focus ring corresponds to a first operation member for MF operation. The control ring is a ring to which a desired function (shutter speed setting, aperture setting, ISO speed setting, or another setting) can be assigned and which allows a user to perform a camera setting operation. In the present exemplary embodiment, the control ring corresponds to a second operation member for an operation other than the MF operation.

The F/C switch 153 is a switch for switching whether the F/C ring 155 is to be operated as the focus ring or the control ring. The user can switch an operation of the F/C ring 155 between the focus ring and the control ring by switching the position of the F/C switch 153.

Further, there are a variety of combinations of switches and rings present on the lens barrel, examples of which will be described below with reference to FIGS. 7A to 7G.

A shutter 101 is a focal plane shutter that allows free control of the exposure time of an image capturing unit 22 under the control of the system control unit 50.

The image capturing unit 22 includes an image capturing element (image sensor) including a charge-couple device (CCD), a complementary metal oxide semiconductor (CMOS) element, or another element that converts an optical image into an electrical signal.

An analog-to-digital (A/D) converter 23 converts an analog signal output from the image capturing unit 22 into a digital signal.

An image processing unit 24 performs predetermined processing (pixel interpolation, resizing processing, such as reduction, color conversion processing, and another type of processing) on data from the A/D converter 23 or data from a memory control unit 15. The image processing unit 24 performs predetermined calculation processing using captured image data, and the system control unit 50 performs exposure control and distance measurement control based on the calculation result obtained by the image processing unit 24. Through the operation, through-the-lens (TTL) AF processing, automatic exposure (AE) processing, flash pre-emission (EF) processing, and another type of processing are performed. In addition, the image processing unit 24 performs predetermined calculation processing using the captured image data, and performs TTL auto white balance (AWB) processing based on the calculated result.

A memory control unit 15 controls data transmission and reception between the A/D converter 23, the image processing unit 24, and a memory 32. The output data from the A/D converter 23 is written in the memory 32 via the image processing unit 24 and the memory control unit 15 or via the memory control unit 15, not via the image processing unit 24. The memory 32 stores image data obtained by the image capturing unit 22 and converted into digital data by the A/D converter 23 and image data to be displayed on the display unit 28 or the EVF 29. The memory 32 has a storage capacity sufficient to store a predetermined number of still images and a predetermined time of moving images and sound. The memory 32 also serves as a memory for image display (video memory). Image data for display written in the memory 32 is displayed by the display unit 28 or the EVF 29 via the memory control unit 15. The display unit 28 and the EVF 29 performs display on a display unit, such as a liquid crystal display (LCD) or an organic electroluminescent (EL) display, based on a signal from the memory control unit 15. Digital signals A/D-converted by the A/D converter 23 and stored in the memory 32 are sequentially transferred to and displayed on the display unit 28 or the EVF 29, whereby live view display is performed. Hereinafter, an image to be live-view-displayed is referred to as a live-view image.

The out-of-finder display unit 43 displays various setting values, such as a shutter speed and an aperture, via an out-of-finder display unit drive circuit 44.

A nonvolatile memory 56 is an electrically erasable and recordable memory, and for example, a flash read-only memory (ROM) is used. The nonvolatile memory 56 stores constants, programs, and the like for operation of the system control unit 50.

The system control unit 50 is a control unit including at least one processor or circuit, and generally controls the camera 100. The system control unit 50 runs a program stored in the nonvolatile memory 56 to carry out each piece of processing to be described below. The system control unit 50 also performs display control by controlling the memory 32, the display unit 28, and other components.

A system memory 52 is, for example, a random-access memory (RAM). The system control unit 50 loads constants and variables for operation of the system control unit 50, a program read from the nonvolatile memory 56, and the like into the system memory 52.

A system timer 53 is a clocking unit that measures times used for various types of control and the time of a built-in clock.

A power source control unit 80 includes a battery detection circuit, a direct-current-to-direct-current (DC-DC) converter, a switch circuit for switching a block to be energized, and other circuitry, and detects whether a battery is mounted, the type of the battery, the remaining battery level, and the like. The power source control unit 80 controls the DC-DC converter based on a detection result and an instruction from the system control unit 50, and supplies a voltage to each unit including the storage medium 200 for a period. A power source unit 30 includes a primary battery, such as an alkaline battery or a lithium battery, a secondary battery, such as a nickel-cadmium (NiCd) battery, a nickel metal hydride (NiNM) battery, or a lithium metal (Li) battery, and an alternating-current (AC) adapter.

An interface (I/F) 18 is an interface with the storage medium 200, such as a memory card or a hard disk. The storage medium 200 is a recording medium, such as a memory card for recording a captured image, and includes a semiconductor memory or a magnetic disk.

A communication unit 54 transmits and receives a video signal and an audio signal to and from an external device connected wirelessly or via a wired cable. The communication unit 54 is also connectable to a wireless local area network (LAN) or the Internet. The communication unit 54 is also communicable with an external device via Bluetooth® or Bluetooth® Low Energy. The communication unit 54 can transmit an image (including a live view image) captured by the image capturing unit 22 and an image recorded in the storage medium 200, and can receive image data and other various kinds of information from an external device.

An orientation detecting unit 55 detects the orientation of the camera 100 with respect to the direction of gravity. Based on the orientation detected by the orientation detecting unit 55, it can be determined whether the image captured by the image capturing unit 22 is an image captured with the camera 100 held horizontally or an image captured with the camera 100 held vertically. The system control unit 50 can add orientation information corresponding to the orientation detected by the orientation detecting unit 55 to an image file of an image captured by the image capturing unit 22, and rotate and record the image. As the orientation detecting unit 55, an acceleration sensor, a gyro sensor, or the like can be used. The movement of the camera 100 (panning, tilting, lifting, whether the camera 100 is still, or the like) is detectable using an acceleration sensor or a gyro sensor as the orientation detecting unit 55.

The eye proximity detecting unit 57 is the eye proximity detecting sensor that detects approach (eye approach) and separation (eye separation) of an eye (object) with respect to the eyepiece portion 16 of the eyepiece finder 17 (approach detection). The system control unit 50 switches between display (display state) and non-display (non-display state) of the display unit 28 and the EVF 29 in accordance with the state detected by the eye proximity detecting unit 57. Specifically, at least in the image capturing standby state is set with the switching setting of the display destination being automatic switching, the display of the display unit 28 is turned on as the display destination, and the EVF 29 is set to the non-display state while no eye proximity is detected. In addition, while the eye proximity is detected, the display of the EVF 29 is turned on as the display destination, and the display unit 28 is set to the non-display state. As the eye proximity detecting unit 57, for example, an infrared proximity sensor can be used. The approach of an object to the eyepiece portion 16 of the eyepiece finder 17 including the EVF 29 is detectable. When an object approaches, infrared light emitted from a light emitting unit (not illustrated) of the eye proximity detecting unit 57 is reflected by the object and received by a light receiving unit (not illustrated) of the infrared proximity sensor. Based on the quantity of infrared light received, it can be determined what distance it is from the approaching object to the eyepiece portion 16 (eyepiece distance). The eye proximity detecting unit 57 thus performs eye proximity detection that detects the proximity distance of an object to the eyepiece portion 16.

The mode changeover switch 60 switches the operation mode of the system control unit 50 to a still image capturing mode, a moving image capturing mode, or another mode. Examples of modes included in the still image capturing mode include an auto image capturing mode, an auto scene determination mode, an MF mode, an aperture priority mode (Av mode), a shutter speed priority mode (Tv mode), and a program AE mode (P mode). In addition, as image capturing settings for individual image capturing scenes, various types of scene modes, custom modes, and the like are supported. The mode changeover switch 60 allows the user to directly switch to any of these modes. Alternatively, after switching to a screen of a list of image capturing modes with the mode changeover switch 60, one of a plurality of displayed modes may be selected and switched using another operation member. Similarly, the moving image capturing mode may include a plurality of modes.

The power source switch 72 switches the power of the camera 100 between ON and OFF.

An operation unit 70 is an input unit that receives a user operation, and is used to input various operation instructions to the system control unit 50. The operation unit 70 includes the shutter button 61 and the touch panel 70*a*. Although not illustrated in FIG. 2, the operation unit 70 further includes the main electronic dial 71, the sub electronic dial 73, the cross key 74, the SET button 75, the moving image button 76, the M-Fn button 77, the playback button 79, and the menu button 81.

The shutter button 61 includes a first shutter switch 62 and a second shutter switch 64. The first shutter switch 62 is turned on during the operation of the shutter button 61, i.e., when the shutter button 61 is half-pressed (image capturing preparation instruction), and generates a first shutter switch signal SW1. In response to the first shutter switch signal SW1, the system control unit 50 starts image capturing preparations, such as AF processing, AE processing, AWB processing, and EF processing. The second shutter switch 64 is turned on when the operation of the shutter button 61 is completed, i.e., when the shutter button 61 is fully pressed (image capturing instruction), and generates a second shutter switch signal SW2. In response to the second shutter switch signal SW2, the system control unit 50 starts a series of image capturing processing from reading a signal from the image capturing unit 22 to writing a captured image as an image file in the storage medium 200.

The touch panel 70*a* is a touch sensor that detects various touch operations on the display surface of the display unit 28 (the operation surface of the touch panel 70*a*). The touch panel 70*a* and the display unit 28 can be integrally configured. For example, the touch panel 70*a* is configured such that the transmittance of light does not interfere with the display of the display unit 28, and is attached to an upper layer of the display surface of the display unit 28. Then, input coordinates on the touch panel 70*a* are associated with display coordinates on the display surface of the display unit 28. This can provide a graphical user interface (GUI) as if the user could directly operate the screen displayed on the display unit 28.

An example configuration of the lens unit 150 will now be described with reference to FIGS. 7A to 7F. One lens unit can be attached to the camera 100, and one of a plurality of types of lens units described with reference to FIGS. 7A to 7G is attached to the camera 100.

FIGS. 7A to 7F illustrate examples in which the F/C ring 155 is mounted to the lens barrel of the lens unit 150. FIG. 7G illustrates an example in which a focus ring 151 and a control ring 154 are mounted to the lens barrel of the lens unit 150 instead of the F/C ring 155.

In FIG. 7A, the F/C ring 155, the AF/MF switch 152, and the F/C switch 153 are mounted to the lens unit 150.

Figure 7B:
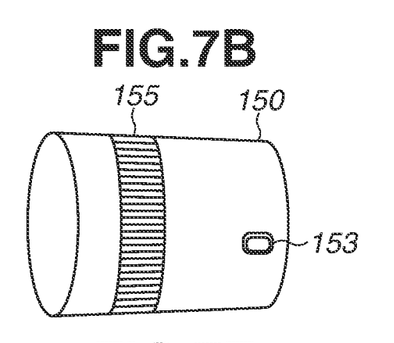

In FIG. 7B, the F/C ring 155 and the F/C switch 153 are mounted to the lens unit 150, and the AF/MF switch 152 is not mounted.

Figure 7C:
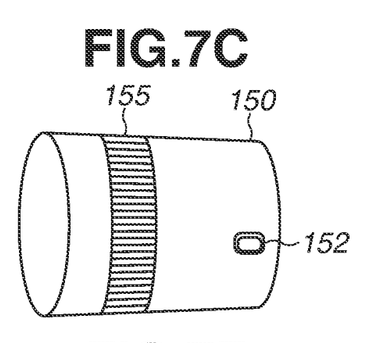

In FIG. 7C, the F/C ring 155 and the AF/MF switch 152 are mounted to the lens unit 150, and the F/C switch 153 is not mounted.

Figure 7D:
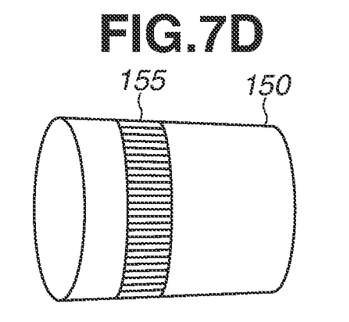

In FIG. 7D, the F/C ring 155 is mounted to the lens unit 150, and the AF/MF switch 152 or the F/C switch 153 is not mounted.

Figure 7E:
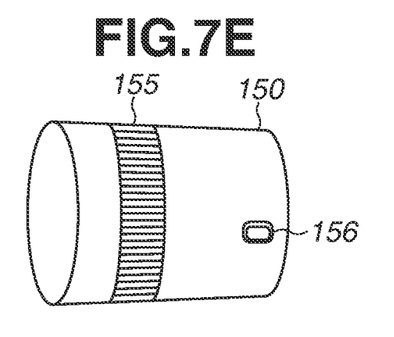

In FIG. 7E, the F/C ring 155 and a ternary switch 156 are mounted to the lens unit 150, and the AF/MF switch 152 or the F/C switch 153 is not mounted. The ternary switch 156 is a switch having three positions of AF, MF, and control (C), and the user can switch the position of the ternary switch 156 to switch the F/C ring 155 and the focus mode. With the position of the ternary switch 156 set to the AF, the F/C ring 155 is operated as the focus ring with the focus mode as the AF. With the position of the ternary switch 156 set to the MF, the F/C ring 155 is operated as the focus ring with the focus mode as the ME. With the position of the ternary switch 156 set to the C, the F/C ring 155 is operated as the control ring with the focus mode set as set on the camera 100.

Figure 7F:
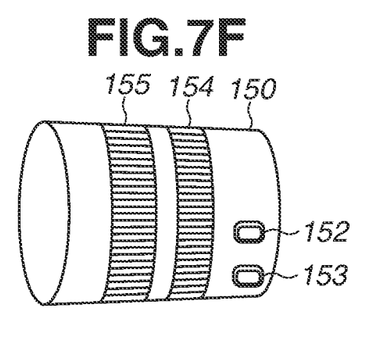
Figure 7G:
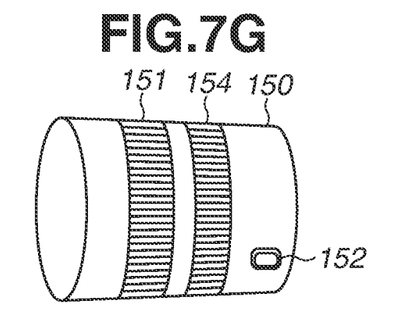

FIG. 7F illustrates a configuration which is the configuration in FIG. 7A provided with the control ring 154. A control ring typically notifies a user of the number of changes by emitting a sound or a feeling for each click operation. On the other hand, a focus ring typically does not emit a sound or a feeling at the time of operation. As two rings are mounted on the lens barrel, it is also possible to mount a control ring and a focus ring. However, in order to satisfy a demand for operating the control ring 154 in a silent manner during moving image capturing or other operations, the configuration allows the F/C ring 155 to be operated as the control ring. Although an example in which the control ring 154 is added to the configuration of FIG. 7A has been described, a configuration in which the control ring 154 is added to any one of the configurations of FIGS. 7B to 7E can be also employed.

In FIG. 7G, the focus ring 151, the control ring 154, and the AF/MF switch 152 are mounted to the lens unit 150.

Without the F/C switch 153 or the ternary switch 156 on the lens barrel, the F/C ring 155 can be switched on a setting screen displayed on the camera 100.

Figure 6A:
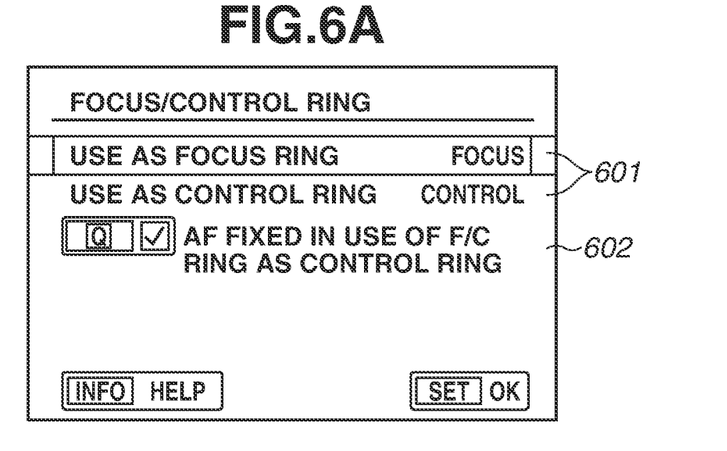
FIGS. 6A to 6C illustrate display examples of setting screens.
Figure 6B:
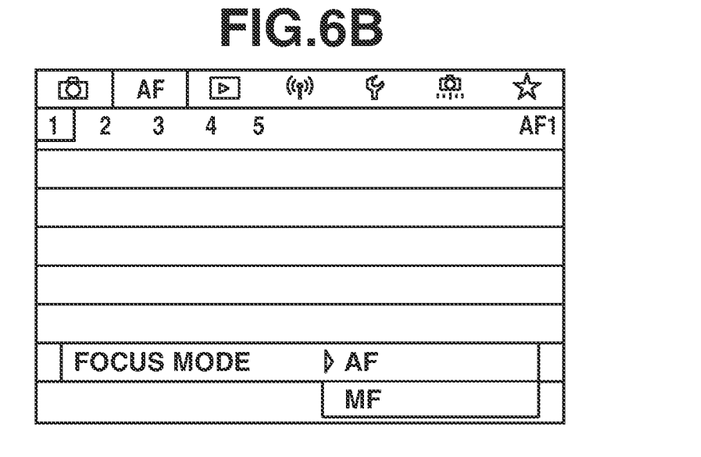
Figure 6C:
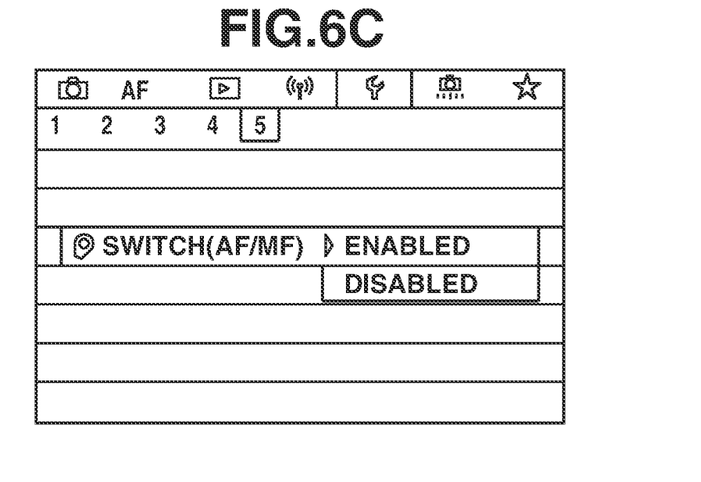

FIGS. 6A to 6C illustrate display examples of some types of setting screen displayed on the camera 100. The setting screens in FIGS. 6A to 6C are displayed, for example, on the display unit 28 and/or the EVF 29 of the camera 100, and setting is made using the touch panel 70*a*, the main electronic dial 71, the sub electronic dial 73, the cross key 74, the SET button 75, or other components. Values set on the setting screens are stored in the nonvolatile memory 56 of the camera 100.

As illustrated in FIG. 6A, the F/C ring 155 can be switched on the setting screen displayed on the camera 100. On the setting screen, a setting portion 601 is displayed to allow the user to select which operation the F/C ring 155 is to perform: the focus ring, and the control ring. In addition, a setting portion 602 for setting whether the AF is fixed when the F/C ring 155 is used as the control ring is displayed. With the AF set to be fixed with the setting portion 602, when the F/C ring 155 is operated as the control ring, the focus mode is controlled to be the autofocus, as will be described below. When the check box is unchecked in the setting portion 602, the setting of the AF to be fixed is cleared. In the initial display (initial setting) of the setting portion 602, the check box is checked. Thus, when the F/C ring 155 is used as the control ring, the AF is normally set to be fixed. If the lens unit 150 includes the F/C ring 155 but does not include a focus ring, focus adjustment cannot be performed with the F/C ring 155 in use as the control ring. Since focus adjustment cannot be performed even with the focus mode set to the MF, the focus mode is basically fixed to the AF with the F/C ring 155 in use as the control ring. However, when the user intentionally unchecks the check box on the setting portion 602, the setting of the AF to be fixed can be cleared.

Figure 8:
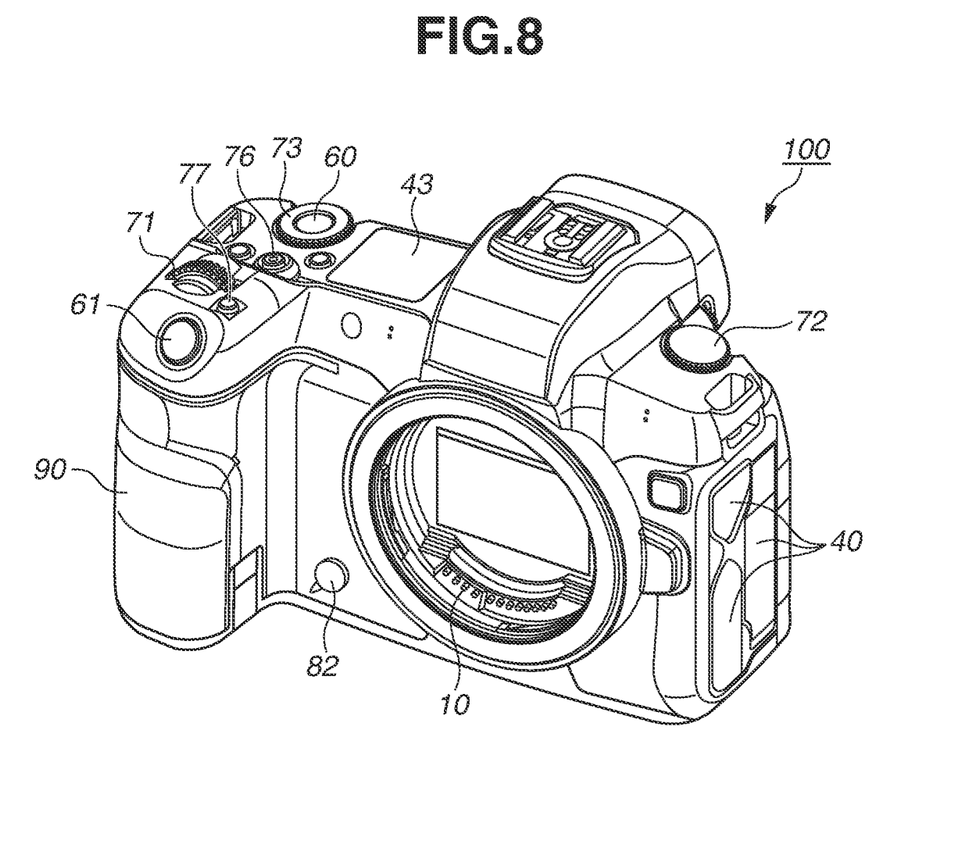
FIG. 8 is an external view of a digital camera (with an autofocus/manual focus (AF/MF) switch) according to the exemplary embodiment.

As illustrated in FIG. 8, the camera 100 may also be equipped with an AF/MF switch 82.

In this case, as illustrated in FIG. 6C, the AF/MF switch 82 may be enabled or disabled on the setting screen displayed on the camera 100. With the AF/MF switch 82 set to be enabled, the focus mode can be set with the AF/MF switch 82. On the other hand, with the AF/MF switch 82 set to be disabled, the AF/MF switch 82 does not affect the state of the camera 100, preventing an erroneous operation of the AF/MF switch 82. Thus, the AF/MF switch 82 can be switched between the enabled state and the disabled state, but the AF/MF switch 82 may be able to switch between the setting of the focus mode and a setting other than the focus mode setting. The AF/MF switch 82 may be customizable or may be prevented from being disabled.

As illustrated in FIG. 6B, the focus mode may be switched to the AF or the MF on the setting screen displayed on the camera 100 instead of the AF/MF switch 82. Although the example has been described as instead of the AF/MF switch 82, the focus mode may be switched to the AF or the MF on a setting screen with the AF/MF switch 82 set to be disabled.

Figure 3:
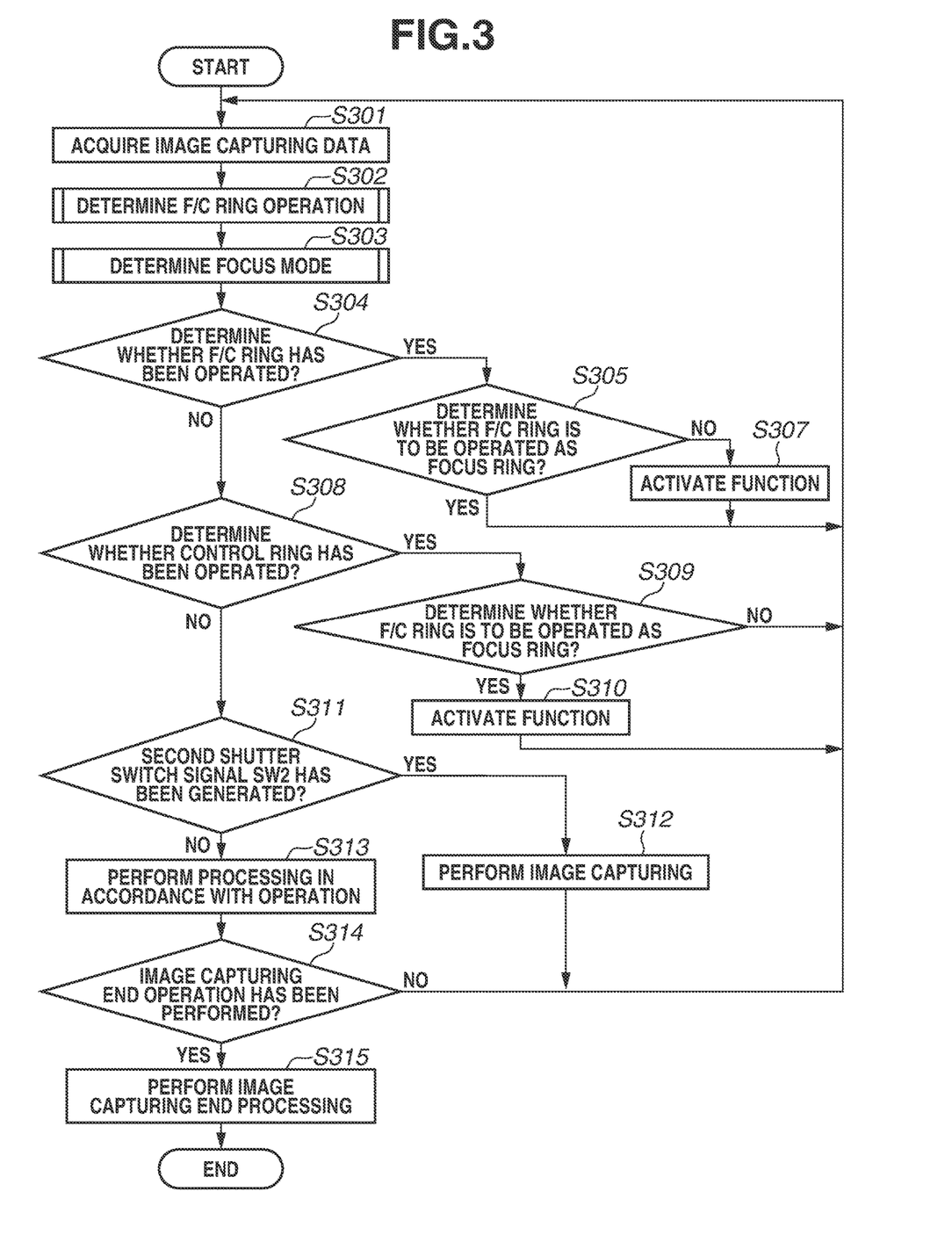
FIG. 3 is a flowchart illustrating processing performed by the digital camera according to the exemplary embodiment.

FIG. 3 is a flowchart illustrating processing performed by the camera 100 according to the exemplary embodiment. This control processing is carried out by the system control unit 50 loading a program stored in the nonvolatile memory 56 into the system memory 52 and running the program. The flowchart of FIG. 3 is started when the camera 100 transitions to the image capturing standby state in which the image capturing standby screen is displayed, such as when the camera 100 is activated or when the operation exits from the menu screen or the playback screen.

In step S301, the system control unit 50 acquires data, for example, about the AF mode, ISO speed, and/or white balance for image capturing from the nonvolatile memory 56. Further, the system control unit 50 acquires data, such as a shutter speed and an aperture value, calculated based on photometric information and/or other information. The system control unit 50 also acquires data, such as a focal length and a switch state held in the lens unit 150 via the communication terminals 6 and 10.

In step S302, the system control unit 50 determines which operation, between the focus ring and the control ring, the F/C ring 155 mounted to the lens unit 150 is to perform. The operation determination processing for the F/C ring 155 in step S302 will be described below with reference to FIG. 4.

In step S303, the system control unit 50 determines which of the AF and the MF to be set for the focus mode. The focus mode determination processing in step S303 will be described below with reference to FIG. 5.

In step S304, the system control unit 50 determines whether the F/C ring 155 has been operated. If the F/C ring 155 has been operated (YES in step S305), the processing proceeds to step S305. On the other hand, if the F/C ring 155 has not been operated (NO in step S305), the processing proceeds to step S308.

In step S305, the system control unit 50 determines whether the F/C ring 155 is to be operated as the focus ring with reference to the operation of the F/C ring 155 determined in step S302. If the F/C ring 155 is to be operated as the focus ring (YES in step S305), the processing returns to step S301. On the other hand, if the F/C ring 155 is not to be operated as the focus ring (NO in step S305), i.e., if the F/C ring 155 is to be operated as the control ring, the processing proceeds to step S307. Since focus movement processing is controlled within the lens unit 150, the system control unit 50 performs no processing. Since the focus movement processing is performed in the lens unit 150, the focus movement processing is performed in the entire image capturing apparatus including the lens unit 150.

In step S307, the system control unit 50 carries out a function assigned to the control ring and the processing returns to step S301.

As in the configuration example of FIG. 7F, the F/C ring 155 and the control ring 154 are mounted to the lens unit 150 in some cases. In this case, if the F/C ring 155 is operated as the control ring, the control ring 154 is not operated in order to prevent any erroneous operations. This processing, which is performed in steps S308 to S310, will be described.

In step S308, the system control unit 50 determines whether the control ring 154 mounted to the lens unit 150 has been operated. If the control ring 154 has been operated (YES in step S308), the processing proceeds to step S309. On the other hand, if the control ring 154 has not been operated (NO in step S308), the processing proceeds to step S311.

In step S309, the system control unit 50 determines whether the F/C ring 155 is to be operated as the focus ring with reference to the operation of the F/C ring 155 determined in step S302. If the F/C ring 155 is to be operated as the focus ring (YES in step S309), the processing proceeds to step S310. On the other hand, if the F/C ring 155 is not to be operated as the focus ring (NO in step S309), i.e., if the F/C ring 155 is to be operated as the control ring, the processing returns to step S301.

In step S310, the system control unit 50 carries out a function assigned to the control ring 154, and the processing returns to step S301.

In step S311, the system control unit 50 determines whether the second shutter switch signal SW2 has been generated by a full press of the shutter button 61. If the second shutter switch signal SW2 has been generated (YES in step S311), the processing proceeds to step S312. On the other hand, if the second shutter switch signal SW2 has not been generated (NO in step S311), the processing proceeds to step S313.

In step S312, the system control unit 50 performs image capturing processing, and the processing returns to step S301.

In step S313, the system control unit 50 performs processing according to the operation.

In step S314, the system control unit 50 determines whether an image capturing end operation has been performed. If the image capturing end operation has been performed (YES in step S314), the processing proceeds to step S315. On the other hand, if the image capturing end operation has not been performed (NO in step S314), the processing returns to step S301.

In step S315, the system control unit 50 performs image capturing end processing, and ends the processing in this flowchart.

Figure 4:
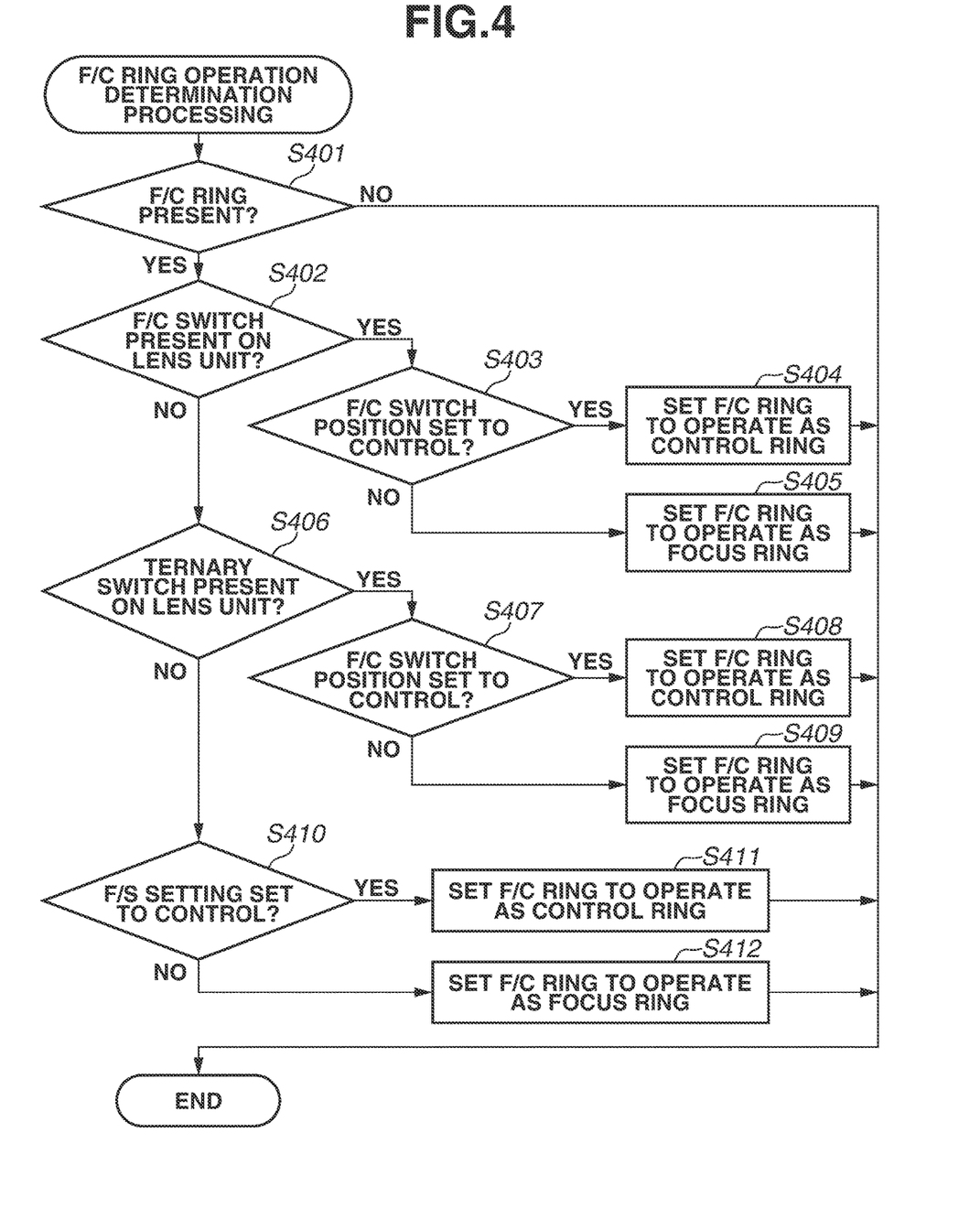
FIG. 4 is a flowchart illustrating details of operation determination processing for a focus/control (F/C) ring.

The operation determination processing for the F/C ring 155 in step S302 of FIG. 3 will now be described in detail with reference to FIG. 4.

In step S401, the system control unit 50 determines whether the F/C ring 155 is present on the lens unit 150. If the F/C ring 155 is present (YES in step S401), the processing proceeds to step S402. In the configuration examples of FIGS. 7A to 7F, the F/C ring 155 is present, so that the processing proceeds to step S402. On the other hand, if the F/C ring 155 is not present (NO in step S401), the processing exits from this flowchart. The F/C ring 155 is not present in the configuration example of FIG. 7G, so that the processing exits from this flowchart.

In step S402, the system control unit 50 determines whether the F/C switch 153 is present on the lens unit 150. If the F/C switch 153 is present, the processing proceeds to step S403. The F/C switch 153 is present in the configuration examples of FIGS. 7A, 7B, and 7F (YES in step S402), so that the processing proceeds to step S403. On the other hand, if the F/C switch 153 is not present (NO in step S402), the processing proceeds to step S406. The F/C switch 153 is not present in the configuration examples of FIGS. 7C, 7D, and 7E, the processing proceeds to step S406.

In step S403, the system control unit 50 determines whether the position of the F/C switch 153 is set to the C. If the position of the F/C switch 153 is set to the C (YES in step S403), the processing proceeds to step S404. On the other hand, if the position of the F/C switch 153 is not set to the C (NO in step S403), i.e., if the position of the F/C switch is set to the focus, the processing proceeds to step S405.

In step S404, the system control unit 50 sets the F/C ring 155 to be operated as the control ring, and the processing exits from the flowchart.

In step S405, the system control unit 50 sets the F/C ring 155 to be operated as the focus ring, and the processing exits from the flowchart.

As described above, in the configuration examples of FIGS. 7A, 7B, and 7F, the operation of the F/C ring 155 is performed in accordance with the position of the F/C switch 153.

In step S406, the system control unit 50 determines whether the ternary switch 156 is present on the lens unit 150. If the ternary switch 156 is present (YES in step S406), the processing proceeds to step S407. The ternary switch 156 is present in the configuration example of FIG. 7E, so that the processing proceeds to step S407. On the other hand, if the ternary switch 156 is not present (NO in step S406), the processing proceeds to step S410. The ternary switch 156 is not present in the configuration examples of FIGS. 7C and 7D, so that the processing proceeds to step S410.

In step S407, the system control unit 50 determines whether the position of the ternary switch 156 is set to the C. If the position of the ternary switch 156 is set to the C (YES in step S407), the processing proceeds to step S408. On the other hand, if the position of the ternary switch 156 is not set to the C (NO in step S407), i.e., if the position is set to the AF or the MF, the processing proceeds to step S409.

In step S408, the system control unit 50 sets the F/C ring 155 to be operated as the control ring, and the processing exits from the flowchart.

In step S409, the system control unit 50 sets the F/C ring 155 to be operated as the focus ring, and the processing exits from the flowchart.

Thus, in the configuration example of FIG. 7E, the operation of the F/C ring 155 is performed in accordance with the position of the ternary switch 156.

If neither the F/C switch 153 nor the ternary switch 156 is present on the lens unit 150 as in the configuration examples of FIGS. 7C and 7D, the operation of the F/C ring 155 is switched on the setting screen displayed by the camera 100 as described in FIG. 6A. The setting of whether the F/C ring 155 is to be operated as the focus ring or the control ring, which is set on the setting screen displayed on the camera 100 and stored in the nonvolatile memory 56, is referred to as an F/C setting. This processing, which is performed in steps S410 to S412, will now be described.

In step S410, the system control unit 50 determines whether the F/C setting stored in the nonvolatile memory 56 of the camera 100 is the C. If the F/C setting is the C (YES in step S410), the processing proceeds to step S411. On the other hand, if the F/C setting is not the C (NO in step S410), i.e., if the F/C setting is hocus, the processing proceeds to step S412.

In step S411, the system control unit 50 sets the F/C ring 155 to be operated as the control ring, and the processing exits from the flowchart.

In step S412, the system control unit 50 sets the F/C ring 155 to be operated as the focus ring, and the processing exits from the flowchart.

As described above, in the configuration examples of FIGS. 7C and 7D, the operation of the F/C ring 155 is performed in accordance with the setting set on the setting screen.

Figure 5:
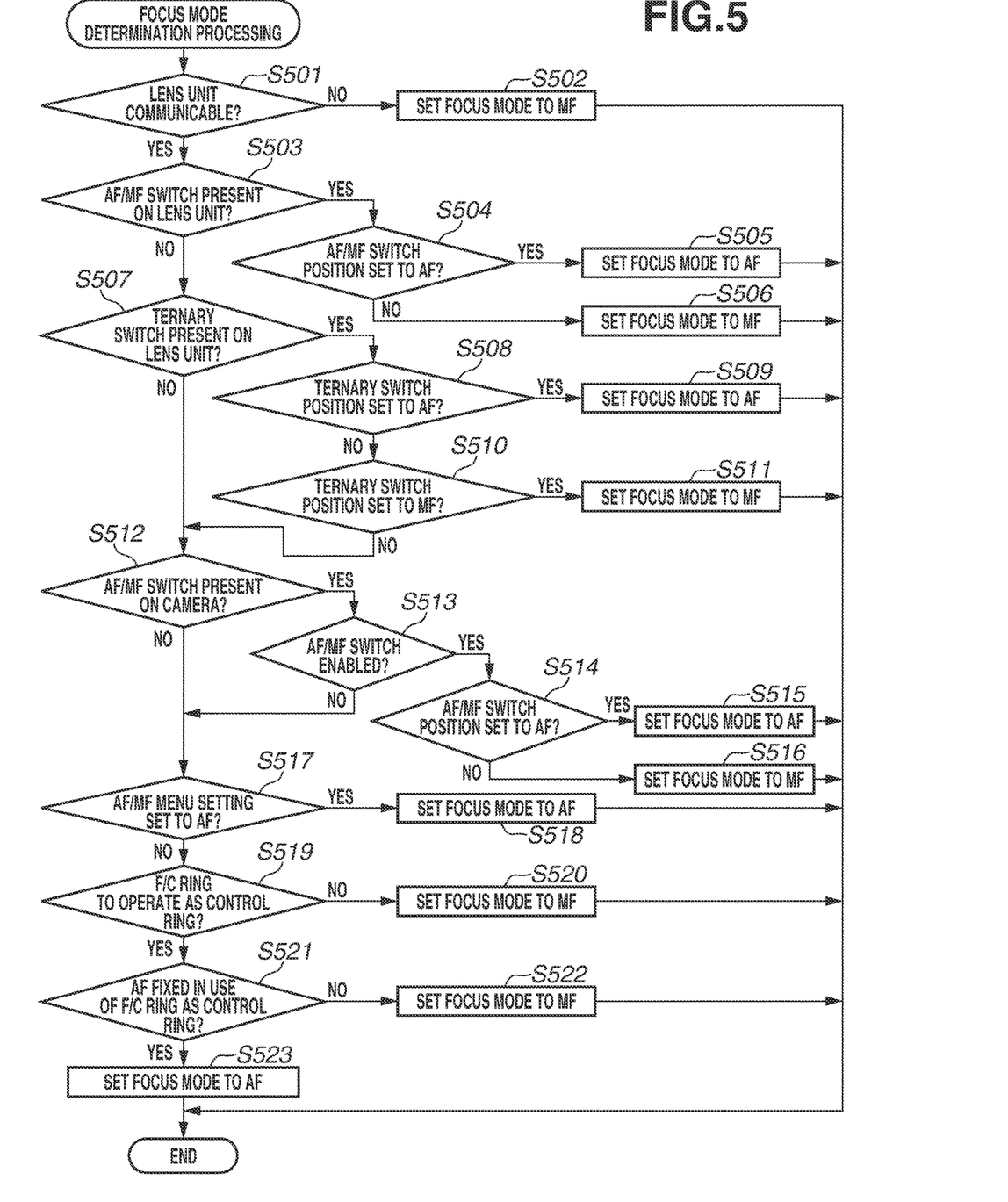
FIG. 5 is a flowchart illustrating details of focus mode determination processing.

The focus mode determination processing of step S303 in FIG. 3 will now be described in detail with reference to FIG. 5.

In step S501, the system control unit 50 determines whether the system control unit 50 is communicable with the lens unit 150 via the communication terminal 10. If the system control unit 50 is communicable with the lens unit 150 (YES in step S501), the processing proceeds to step S503. On the other hand, if the system control unit 50 is not communicable with the lens unit 150 (NO in step S501), the processing proceeds to step S502. A state in which the system control unit 50 is not communicable with the lens unit 150 corresponds to the following states. Examples of the states includes a state where the lens unit 150 is not attached to the camera 100, a state where the lens unit 150 is not correctly attached to the camera 100, a state where the lens unit 150 is out of order, and a state where the lens unit 150 is not compatible with communication.

In step S502, since the system control unit 50 is not communicable with the lens unit 150, and thus cannot perform AF control, the system control unit 50 sets the focus mode to the MF. Then, the processing exits from the flowchart.

In step S503, the system control unit 50 determines whether the AF/MF switch 152 is present on the lens unit 150. If the AF/MF switch 152 is present (YES in step S503), the processing proceeds to step S504. The AF/MF switch 152 is present in the configuration examples of FIGS. 7A, 7C, and 7F, so that the processing proceeds to step S504. On the other hand, if the AF/MF switch 152 is not present (NO in step S503), the processing proceeds to step S507. The AF/MF switch 152 is not present in the configuration examples of FIGS. 7B, 7D, and 7E, so that the processing proceeds to step S507.

In step S504, the system control unit 50 determines whether the position of the AF/MF switch 152 is set to the AF. If the position of the AF/MF switch 152 is set to the AF (YES in step S504), the processing proceeds to step S505. On the other hand, if the position of the AF/MF switch 152 is not set to the AF (NO in step S504), i.e., if the position is set to the MF, the processing proceeds to step S506.

In step S505, the system control unit 50 sets the focus mode to the AF, and the processing exits from the flowchart.

In step S506, the system control unit 50 sets the focus mode to the MF and the processing exits from the flowchart.

As described above, in the configuration examples of FIGS. 7A, 7C, 7F, and 7G, the focus mode is set according to the position of the AF/MF switch 152.

In step S507, the system control unit 50 determines whether the ternary switch 156 is present on the lens unit 150. If the ternary switch 156 is present (YES in step S507), the processing proceeds to step S508. The ternary switch 156 is present on the configuration example of FIG. 7E, so that the processing proceeds to step S508. On the other hand, if the ternary switch 156 is not present (NO in step S507), the processing proceeds to step S512. In the configuration examples of FIGS. 7B and 7D, the ternary switch 156 is not present, so that the processing proceeds to step S512.

In step S508, the system control unit 50 determines whether the position of the ternary switch 156 is set to the AF. If the position of the ternary switch 156 is set to the AF (YES in step S508), the processing proceeds to step S509. On the other hand, if the position of the ternary switch 156 is not set to the AF (NO in step S508), the processing proceeds to step S510.

In step S509, the system control unit 50 sets the focus mode to the AF and the processing exits from the flowchart.

In step S510, the system control unit 50 determines whether the position of the ternary switch 156 is set to the MF. If the position of the ternary switch 156 is set to the MF (YES in step S510), the processing proceeds to step S511. On the other hand, if the position of the ternary switch 156 is not set to the MF (NO in step S510), the processing proceeds to step S512.

In step S511, the system control unit 50 sets the focus mode to the MF, and the processing exits from the flowchart.

As described above, in the configuration example of FIG. 7E, when the position of the ternary switch 156 is set to the AF or the MF, the focus mode is set in accordance with the position of the ternary switch 156, and when the position of the ternary switch 156 is set to the C, the processing proceeds to step S512.

When the AF/MF switch 152 or the ternary switch 156 is mounted on the lens unit 150 as described above, the focus mode is set with the AF/MF switch 152 or the ternary switch 156.

In step S512, the system control unit 50 determines whether the AF/MF switch 82 is present on the camera 100. If the AF/MF switch 82 is present as illustrated in FIG. 8 (YES in step S512), the processing proceeds to step S513. On the other hand, if the AF/MF switch 82 is not present (NO in step S512), the processing proceeds to step S517.

In step S513, the system control unit 50 determines whether the AF/MF switch 82 is set to be enabled. As illustrated in FIG. 6C, the AF/MF switch 82 is settable to be enabled or disabled on the setting screen. If the AF/MF switch 82 is set to be enabled (YES in step S513), the processing proceeds to step S514. If the AF/MF switch 82 is not set to be enabled (NO in step S513), i.e., if the AF/MF switch 82 is set to be disabled, the processing proceeds to step S517.

In step S514, the system control unit 50 determines whether the position of the AF/MF switch 82 is set to the AF. If the position of the AF/MF switch 82 is set to the AF (YES in step S514), the processing proceeds to step S515. On the other hand, if the position of the AF/MF switch 82 is not set to the AF (NO in step S514), i.e., if the position of the AF/MF switch 82 is set to the MF, the processing proceeds to step S516.

In step S515, the system control unit 50 sets the focus mode to the AF, and the processing exits from the flowchart.

In step S516, the system control unit 50 sets the focus mode to the MF, and the processing exits from the flowchart.

Without the AF/MF switch 152 or the ternary switch 156 on the lens unit 150 as described above and with the AF/MF switch 82 set to be enabled, the focus mode is set with the AF/MF switch 82. With the ternary switch 156 present with its position set to the C and with the AF/MF switch 82 set to be enabled, the focus mode is set with the AF/MF switch 82.

In step S517, the system control unit 50 determines whether an AF/MF menu setting stored in the nonvolatile memory 56 of the camera 100 is set to the AF. As described in FIG. 6B, an AM/FM setting set on the setting screen displayed on the camera 100 and stored in the nonvolatile memory 56 is referred to as the AF/MF menu setting. If the AF/MF menu setting is set to the AF (YES in step S517), the processing proceeds to step S518. On the other hand, if the AF/MF menu setting is not set to the AF (NO in step S517), i.e., if the AF/MF menu setting is set to the MF, the processing proceeds to step S519.

In step S518, the system control unit 50 sets the focus mode to the AF in accordance with the AF/MF menu setting, and the processing exits from the flowchart.

In step S519, the system control unit 50 determines whether the F/C ring 155 is to be operated as the control ring with reference to the operation of the F/C ring 155 determined in step S302. If the F/C ring 155 is to be operated as the control ring (YES in step S519), the processing proceeds to step S521. On the other hand, if the F/C ring 155 is not to be operated as the control ring (NO in step S519), i.e., if the F/C ring 155 is to be operated as the focus ring, the processing proceeds to step S520.

In step S520, the system control unit 50 sets the focus mode to the MF in accordance with the AF/MF menu setting, and the processing exits from the flowchart.

In step S521, the system control unit 50 determines whether the AF is set to be fixed when the F/C ring 155 is used as the control ring as described in FIG. 6A. If the AF is set to be fixed (YES in step S521), the processing proceeds to step S523. On the other hand, if the AF is not set to be fixed (NO in step S521), the processing proceeds to step S522.

In step S522, the system control unit 50 sets the focus mode to the MF in accordance with the AF/MF menu setting, and the processing exits from the flowchart.

In step S523, the system control unit 50 sets the focus mode to the AF, and the processing exits from the flowchart. In other words, the system control unit 50 performs control to set the focus mode to the AF regardless of the setting of the focus mode at the AF/MF menu setting.

As described above, when the F/C ring 155 is to be operated as the control ring, the focus mode is controlled to be set to the AF. This prevents a combination of the setting with which the F/C ring 155 is to be operated as the control ring and the setting with which the focus mode is the MF from being made. Consequently, the inconvenience that, even though the focus mode is set to the MF, an out-of-focus state cannot be quickly brought into an in-focus state by using the F/C ring 155 can be avoided. In addition, there is no need of switching the F/C ring 155 to be operated as the focus ring or switching the focus mode to the AF, which prevents the operability from being impaired. Thus, the inconvenience caused by the combination of the switching setting of the F/C ring 155 and the focus mode is obviated.

In the present exemplary embodiment, the AF/MF switches 82 and 152 and the ternary switch 156 are mounted. When the focus mode is explicitly and uniquely set with these physical switches, and even when the F/C ring 155 is operated as the control ring, the focus mode is set as set with these physical switches. When the focus mode is set to the MF with these physical switches, and even when the F/C ring 155 is operated as the control ring, the focus mode is not set to the AF but is set to the ME. When the focus mode is set with the physical switches as described above, the user is often clearly aware of whether the focus mode is the AF or the MF. Control for automatically setting to the AF is, therefore, not performed. The AF/MF switches 82 and 152 and the ternary switch 156 correspond to predetermined operation units according to the disclosure.

Without the AF/MF switches 82 and 152 and the ternary switch 156, or with the focus mode not set with the ternary switch 156 but set with the AF/MF menu setting, when the F/C ring 155 is operated as the control ring, control is performed so that the AF is set regardless of the setting of the focus mode with the AF/MF menu setting. The AF/MF menu setting set in the past may be stored in the nonvolatile memory 56 and the user may not be aware of whether the AF/MF menu setting is set to the AF or the MF. Control for automatically setting to the AF is, therefore, performed. The operation configuration of a setting screen displayed on the camera 100 corresponds to another operation unit according to the disclosure.

However, the disclosure is not limited to the present exemplary embodiment. The focus mode can be set to the AF when the F/C ring 155 is operated as the control ring, regardless of how AF/MF is set.

As described in FIG. 6A, when the F/C ring 155 is set to be operated as the control ring, whether control is performed to fix the focus mode to the AF or not can be selected and set. However, without this setting, the AF may be fixed.

In the present exemplary embodiment, the lens unit 150 is detachable from the camera 100, but the camera and the lens may be integrated as one unit.

Although the F/C ring 155 mounted on the lens unit 150 has been described as the dual-purpose operation member according to the disclosure, the dual-purpose operation member may be, for example, an operation member mounted on the camera 100.

Although an example in which the F/C switch 153 is mounted on the lens unit 150 has been described, it may be mounted on the camera 100 side, for example.

The setting values stored in the camera 100 may be stored in a control device that remotely controls the camera via wired or wireless communication. Examples of an apparatus that remotely controls a camera include a smartphone, a tablet PC, and a desktop PC.

Other Embodiments

Embodiment(s) of the disclosure can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc™ (BD)), a flash memory device, a memory card, and the like.

While the disclosure has been described with reference to exemplary embodiments, it is to be understood that the disclosure is not limited to the disclosed exemplary embodiments. The scope of the following claims is to be accorded the broadest interpretation so as to encompass all such modifications and equivalent structures and functions.

This application claims the benefit of Japanese Patent Application No. 2022-134690, filed Aug. 26, 2022, which is hereby incorporated by reference herein in its entirety.

What is claimed is:

1. An apparatus configured to set a focus mode to autofocus for automatically focusing on a subject or manual focus for manually focusing on a subject, the apparatus comprising:
    at least one processor;
    a memory coupled to the at least one processor storing instructions
    that, when executed by the at least one processor, cause the at least one processor to function as:
    a control unit configured to perform control to set the focus mode to the autofocus when a dual-purpose member configured to switch to be operated as a first member for manual focus operation or to be operated as a second member for an operation other than the manual focus operation is operated as the second member,
    wherein a first lens unit including the dual-purpose member and a focus mode setting portion for switching the focus mode in accordance with a user operation is attachable to the apparatus, and
    wherein a second lens unit including the dual-purpose member without the focus mode setting portion is attachable to the apparatus.

2. The apparatus according to claim 1, wherein the control unit does not set the focus mode to the autofocus but sets the focus mode to the manual focus even when the dual-purpose member is operated as the second member in a case where the focus mode is set to the manual focus with a predetermined unit.

3. The apparatus according to claim 2, wherein the control unit performs, in a case where the predetermined unit is not provided and the focus mode is set with another unit different from the predetermined unit, control to set the focus mode to the autofocus when the dual-purpose member is operated as the second member, regardless of a focus mode setting at the other unit.

4. The apparatus according to claim 1, wherein the at least one processor further functions as a setting unit configured to set whether the dual-purpose member is operated as the first member or the second member.

5. The apparatus according to claim 1, wherein the at least one processor further functions as a selection unit configured to select whether control for fixing the focus mode to the autofocus is performed or not when the dual-purpose member is set to be operated as the second member.

6. The apparatus according to claim 1, further comprising a lens unit,
    wherein the dual-purpose member is a member included in the lens unit.

7. The apparatus according to claim 6, wherein the dual-purpose member is a ring provided on a lens barrel of the lens unit.

8. The apparatus according to claim 1,
    wherein the control unit sets, in a case where the first lens unit is attached to the apparatus, the focus mode to a focus mode set at the focus mode setting portion, regardless of whether the dual-purpose member is operated as the second member, and wherein the control unit performs, in a case where the second lens unit is attached to the apparatus, control to set the focus mode to the autofocus when the dual-purpose member is operated as the second member.

9. The apparatus according to claim 8, wherein the at least one processor further functions as a setting unit configured to set the focus mode via a setting screen, wherein the control unit performs, in a case where the second lens unit is attached to the apparatus, control to set the focus mode to the autofocus when the dual-purpose member is operated as the second member, regardless of a focus mode setting set with the setting unit.

10. The apparatus according to claim 9, wherein the at least one processor further functions as a specific member configured to set the focus mode, wherein the control unit performs, in a case where the second lens unit is attached to the apparatus, control to set the focus mode to a focus mode set with the specific member, regardless of whether the dual-purpose member is operated as the second member.

11. The apparatus according to claim 10, wherein the at least one processor further functions as a setting unit configured to set whether a focus mode setting with the specific member is enabled or disabled, wherein the control unit performs, in a case where the focus mode setting with the specific member is enabled, control to set the focus mode to a focus mode set with the specific member when the second lens unit is attached to the apparatus, regardless of whether the dual-purpose member is operated as the second member, and wherein the control unit performs, in a case where the focus mode setting with the specific member is disabled, control to set the focus mode based on the set focus mode setting and whether the dual-purpose member is operated as the second member or not.

12. The apparatus according to claim 10, wherein the specific member is a switch for switching the focus mode to the autofocus or the manual focus.

13. The apparatus according to claim 8, wherein the at least one processor further functions as a setting unit configured to set whether the dual-purpose member is to be operated as the first member or the second member, and to set whether the focus mode is to be controlled and fixed to the autofocus or not when the dual-purpose member is set to be operated as the second member.

14. The apparatus according to claim 13, wherein the setting unit sets, in a case where the dual-purpose member is set to be operated as the second member, as an initial setting, a setting for controlling the focus mode to be fixed to the autofocus.

15. The apparatus according to claim 8, wherein the focus mode setting portion is a switch for switching the focus mode to the autofocus or the manual focus.

16. A method for controlling an apparatus configured to set a focus mode to autofocus for automatically focusing on a subject or manual focus for manually focusing on a subject, the method comprising:

performing control to set the focus mode to the autofocus when a dual-purpose member configured to switch to be operated as a first member for manual focus operation or to be operated as a second member for an operation other than the manual focus operation is operated as the second member, wherein the dual-purpose member included in a first lens unit and a focus mode setting portion for switching the focus mode in accordance with a user operation is attachable to the apparatus, and wherein the dual-purpose member included in a second lens unit without the focus mode setting portion is attachable to the apparatus.

17. A non-transitory computer-readable storage medium storing a program for controlling an apparatus configured to set a focus mode to autofocus for automatically focusing on a subject or manual focus for manually focusing on a subject, the program causing a computer to execute processing of performing control to set the focus mode to the autofocus when a dual-purpose member configured to switch to be operated as a first member for manual focus operation and to be operated as a second member for an operation other than the manual focus operation is operated as the second member, wherein the dual-purpose member included in a first lens unit and a focus mode setting portion for switching the focus mode in accordance with a user operation is attachable to the apparatus, and wherein the dual-purpose member included in a second lens unit without the focus mode setting portion is attachable to the apparatus.

\* \* \* \* \*